May 11, 1954     J. P. WOODS     2,678,107
APPARATUS FOR ELIMINATING HORIZONTALLY TRAVELING WAVES
Filed Nov. 9, 1949     3 Sheets-Sheet 1

ATTEST

INVENTOR.
JOHN PRICE WOODS
BY
Attorney

May 11, 1954   J. P. WOODS   2,678,107
APPARATUS FOR ELIMINATING HORIZONTALLY TRAVELING WAVES
Filed Nov. 9, 1949   3 Sheets-Sheet 2
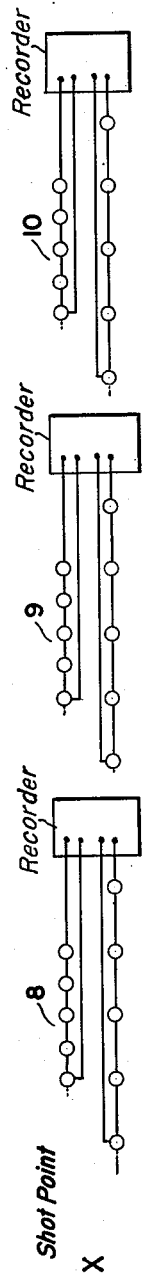
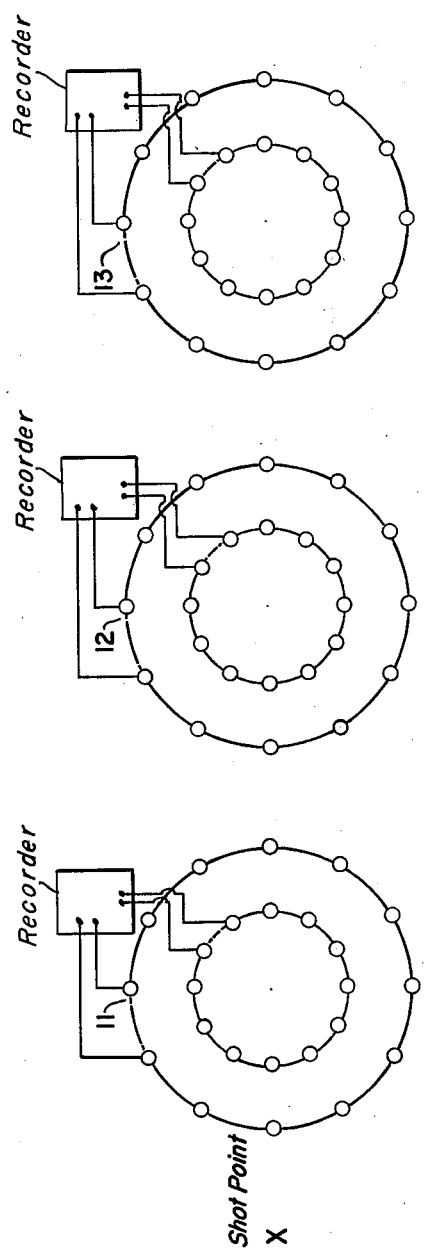
ATTEST
INVENTOR.
JOHN PRICE WOODS
BY
Attorney

UNITED STATES PATENT OFFICE 2,678,107

APPARATUS FOR ELIMINATING HORIZONTALLY TRAVELING WAVES

John P. Woods, Dallas, Tex., assignor to The Atlantic Refining Company, Philadelphia, Pa., a corporation of Pennsylvania Application November 9, 1949, Serial No. 126,278

14 Claims. (Cl. 181—0.5)

This invention relates to improvements in seismic prospecting, and particularly to arrangements of geophones in a group for elimination from the seismogram of horizontally traveling waves over a predetermined frequency band.

In seismic prospecting it is general practice to detonate an explosive charge at or near the surface of the earth, and to receive resulting seismic energy or waves reflected from subsurface formations by means of a series of geophones making up a so-called "spread." The geophones are connected to a seismograph or recorder to produce multitrace records of the reflected energy which may be interpreted in determination of subsurface structure.

In practice, areas are frequently encountered in which horizontally traveling waves, reflected from hard rock at or near the surface or of any other origin, are received by the geophones and transmitted to the seismograph to appear on the record. This horizontally traveling energy is of such nature that it predominates all or a major portion of the record over the entire frequency band of the reflected waves, thereby obscuring the desired reflected waves on the record. It is conventional practice in the industry to utilize a spread consisting of a series of geophone groups, the geophones in each group being arranged in a manner so as to eliminate horizontally traveling waves of a given frequency. Since the undesirable waves cover a band of frequencies, mere elimination of horizontally traveling waves of a single frequency however does not overcome the difficulties above mentioned.

More recently, use has been made of several such groups of geophones for the production of each record trace, the geophones of each group being associated with a filter circuit and so constructed and arranged as to provide a joint output in which the reflected energy of a given frequency is predominant and the horizontally traveling waves of the same frequency have been eliminated. By employing a number of such geophone group-filter combinations, each responsive to a different, predetermined frequency, a record trace may be produced of reflected seismic waves of such predetermined frequencies and substantially free of horizontally traveling waves of the same frequencies.

That system is not entirely satisfactory however because it necessitates the use of several filter circuits, extra equipment which requires accurate and periodic adjustment. In practice, it is important to reduce to a minimum the amount of apparatus required for conducting seismic prospecting operations. In addition, it is desirable to utilize all reflected waves within a relatively wide frequency band in producing the record trace. This would necessitate the use of a prohibitive number of geophone group-filter combinations.

Accordingly, it is an object of this invention to provide novel arrangements of geophones in a group for obviating the above difficulties.

Another object is to provide arrangements of geophones in a group whereby a single record trace may be formed substantially free of horizontally traveling waves within a predetermined frequency band.

A further object is to provide groups of geophones whereby a multitrace record may be formed substantially free of horizontally traveling waves within a predetermined frequency band.

Another object is to provide groups of geophones, the geophones in each group being arranged so that the combined output energy is predominated by reflected seismic energy and is substantially free of horizontally traveling waves within a predetermined frequency band and moving longitudinally along the group.

A still further object is to provide groups of geophones, the geophones in each group being arranged so that the combined output energy is predominated by reflected seismic energy and is substantially free of horizontally traveling waves within a predetermined frequency band and moving in any direction relative to the group.

Other objects and features of this invention will be apparent from the description and drawings which follow.

In accordance with the present invention, there is utilized a group of geophones for the production of each record trace. The geophones are disposed so as to form two arrays which are adapted by the relative spacing of the geophones in each array to provide a joint output in which the reflected wave energy is predominant and the horizontally traveling energy within a predetermined frequency band is eliminated. The two arrays are of unequal lengths but of lengths such that the individual response of each array to horizontally traveling waves of a single predetermined frequency is zero. By combining the outputs of these arrays, there is produced a single record trace of reflected energy to the substantial exclusion of horizontally traveling energy within a predetermined frequency band, the mid-frequency of which corresponds approximately to said predetermined frequency.

Further, in accordance with the invention, several such geophone groups are utilized to provide the usual multitrace record of reflected energy, but substantially free of horizontally traveling energy within a predetermined frequency band, each of the traces being formed in the manner briefly described above.

For a more detailed understanding of the invention, reference is made to the accompanying drawings in which:

Figure 4 is a diagrammatic view showing a seismometer spread including several geophone groups similar to that of Figure 1 for providing multitrace records of reflected waves.

Figure 5 is a diagrammatic view showing a seismometer spread including several geophone groups similar to that of Figure 3 for providing multitrace records of reflected waves.

As above briefly stated, seismograms or records obtained in many areas are of little value in the determination of subterranean structure because the reflected energy is obscured by intense, horizontally traveling waves produced by the same detonation as the reflected waves. The amplifiers associated with conventional seismographs or recorders usually are responsive to a seismic wave within a given frequency band such, for example, as from 30 to 60 cps. Accordingly, it is one purpose of this invention to provide arrangements of geophones or detectors in a group, the output of which is substantially free of horizontally traveling waves within a predetermined frequency band, preferably corresponding to that of the seismograph amplifiers, thereby to provide a single record trace predominated by reflected energy and substantially free of horizontally traveling energy.

It has been found that such a record trace may be obtained by arranging a plurality of geophones of a group into two parallel arrays of unequal lengths but of lengths such that the individual response of each array to horizontally traveling waves of a predetermined frequency is zero. The combined output of the arrays will be predominated by reflected waves and free of horizontally traveling waves within a frequency band, the mid-frequency of which corresponds approximately to said predetermined frequency.

It is well known that horizontally traveling waves of a given frequency may be eliminated from the output of a geophone group by arranging the geophones in a straight line and spacing the geophones one from another a distance such that the array length L corresponds to an integral number of wave lengths of waves having said given frequency and which it is desired to eliminate. With proper adjustment of the array length L, seismic waves of any desired frequency may be eliminated from the output of the geophone group. By "array length" is meant the distance between a point beyond the geophone at one end of the array a distance corresponding to one-half the distance between adjacent geophones and a point a like distance beyond the geophone at the other end of the array. In accordance with the present invention, by utilizing in a single geophone group two such arrays disposed in parallel relationship and of unequal lengths but of lengths such that the individual response of each array to horizontally traveling waves of a predetermined frequency is zero, a single record may be produced from which all seimic waves within a predetermined frequency band have been substantially eliminated.

In some areas the character of the earth's surface is such that the horizontally traveling waves move in one direction only relative to the geophone spread, while in other areas such waves travel in many directions.

Figure 1:
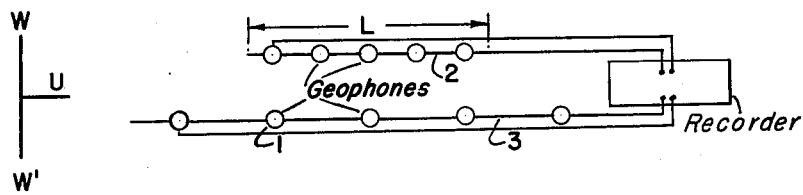
Figure 1 is a diagrammatic view showing a geophone arrangement for producing a single record trace or reflected waves substantially free of horizontally traveling waves within a predetermined frequency band and moving longitudinally along the arrays.

Referring to the drawings, and at this time particularly to Figure 1, there is shown a geophone group adapted, by the arrangement of the geophones in each of two arrays, for use in areas of the first type to eliminate the interfering waves traveling longitudinally of the group, the line W—W' representing the front of such a wave and the line U the direction of travel thereof. It will be noted that the geophones 1 are positioned so as to form two parallel, straight line arrays 2 and 3, each comprising five geophones of like sensitivity and equally spaced one from another. Although, for purposes of illustration, the arrays are shown as being composed of five geophones each, a greater or lesser number may be employed, provided, however, that each array includes at least two geophones, and preferably at least three.

In the case of the geophone group shown in Figure 1 and formed, in accordance with this invention, in two parallel, straight line arrays for eliminating horizontally traveling waves moving longitudinally along the arrays only, the array lengths are unequal, but are adjusted by varying the spacing between the geophones so that each corresponds to an integral number of wave lengths of a wave having a frequency $f_0$ corresponding approximately to the mid-frequency of the band of waves to be eliminated from the combined output of the group. It is preferable, in the interest of saving time and expense, to have the length of one array 2 equal one wave length of the predetermined frequency; and the length of the other array 3 twice as great. The geophones 1 of each array 2 and 3 are connected together either in series or parallel, as desired, and in turn the two arrays 2 and 3 are connected together to provide a combined output for forming a single record trace. It will be noted that by arranging the geophones as above described, horizontally traveling waves of a single predetermined frequency are cancelled or eliminated by each of the arrays 2 and 3 individually. Moreover, by combining the two arrays, horizontally traveling waves within a predetermined frequency band are cancelled to provide a record trace predominated by reflected waves.

Figure 6:
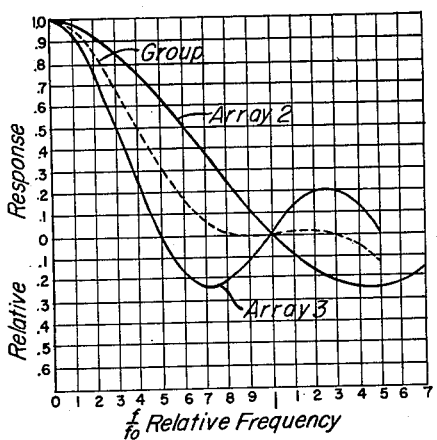
Figure 6 is a series of curves showing the relationship of the relative response of each of the arrays of a group of geophones arranged as shown in Figure 1, and of the entire group, to the relative frequency of horizontally traveling waves.

Figure 6 is a series of curves illustrating the relationship of the relative response of each of the arrays 2 and 3, and also of the group, to the relative frequency of horizontally traveling waves for the geophone arrangement shown in Figure 1 with lengths of arrays 2 and 3 corresponding respectively to the wave length and twice the wave length of seismic waves of a given frequency $f_0$. The relative frequency is the ratio of the frequency of a particular horizontally traveling wave $f$ to the given frequency $f_0$. The relative response is the ratio of the actual response of the geophones to the maximum possible response of the geophones which is attained whenever the on-coming wave front is parallel, rather than perpendicular as W—W', to the array. It will be noted that the relative response of each of the arrays 2 and 3 is zero when the relative frequency is 1, that is, when the frequency $f$ of the horizontally traveling waves corresponds to the predetermined frequency $f_0$. It will be noted further that the relative response of the group is less than 5 per cent of the maximum possible response for horizontally traveling waves within the frequency band 0.74 $f_0$ to 1.35 $f_0$.

By way of illustration, assuming that a conventional seismic amplifier is to be used for amplifying received waves in accordance with usual practice, which amplifier is responsive only to seismic energy within a frequency band of from 35 to 60 cps., preferably one of the arrays 2 is adjusted to a length of 142.2 feet, corresponding to the wave length of the mid-frequency of the recorder band; and array 3, to a length of 284.4 feet. As above pointed out, the response of the geophone group is less than 5 per cent of the maximum possible response within the frequency band of 0.74 $f_0$ to 1.35 $f_0$, or in this illustration from 33 to 61 cps. It is thus seen that a record trace may be obtained which is predominated by reflected waves.

Figure 2:
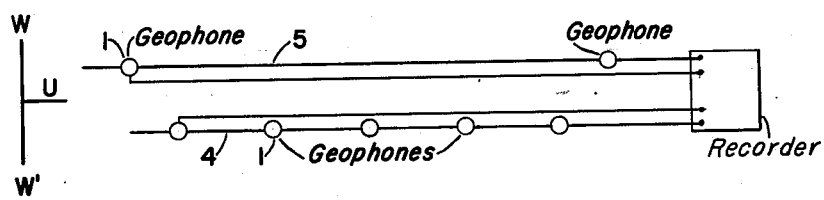
Figure 2 is a diagrammatic view of a modification of the geophone arrangement of Figure 1 in which one of the arrays consists of only two geophones.
Figure 7:
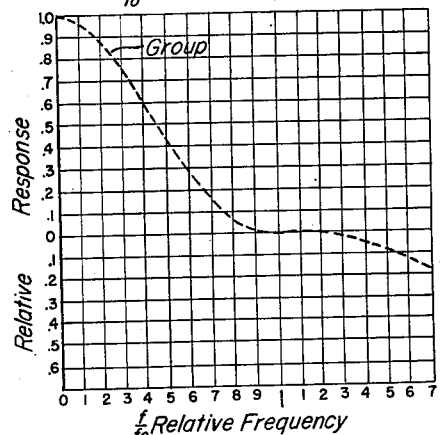
Figure 7 is a curve showing the relationship of the relative response of a group of geophones arranged as shown in Figure 2 to the relative frequency of horizontally traveling waves.

Figure 2 shows a modified geophone group comprising one array 4 of five geophones and another array 5 of two geophones, the length of array 5 being three times that of array 4. Because of the greater number of geophones in array 4, the sensitivity of the geophones in that array is made one-half that of the geophones of array 5. It is preferable to adjust the sensitivity in this manner so that greater cancellation in the output of the group is obtained than would have been obtained had the sensitivity of the geophones in array 4 not been decreased. The relationship of relative response of the group to relative frequency is shown in Figure 7. It will be noted that the relative response of the group for horizontally traveling waves moving longitudinally therealong is less than 5 per cent of the maximum possible response within the frequency band 0.82 $f_0$ to 1.39 $f_0$.

Figure 3:
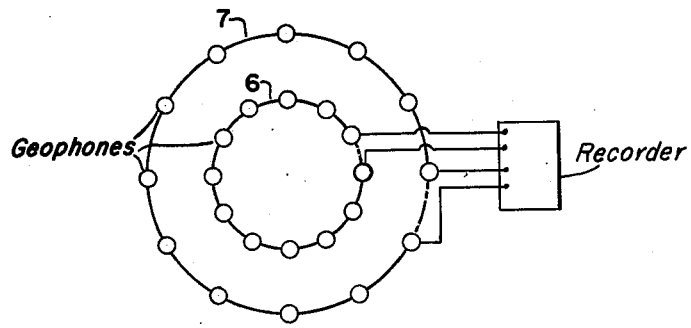
Figure 3 is a diagrammatic view showing a geophone arrangement including two circular arrays for producing a single record trace of reflected waves substantially free of all horizontally traveling waves within a predetermined frequency band.

Referring now to Figure 3, in areas where the character of the surface is such that the undesirable horizontally traveling waves move in many directions relative to the spread, it is necessary to arrange the geophones of a group into two concentric circular arrays 6 and 7, each of the arrays including at least six geophones and preferably twelve, equally spaced one from another. The circular arrays 6 and 7 are of unequal lengths but of lengths such that the individual response of each array to horizontally traveling waves of a predetermined frequency is zero. The array lengths may be determined either experimentally or by simple mathematical calculations. Preferably, one of the arrays 6 is formed so that its length, the circumference of the circle formed by the geophones, is equal to $0.76\pi$ times the wave length of wave of a given frequency $f_0$, preferably the mid-frequency of the frequency band within which it is desired to cancel the undesirable waves. The length of the other circular array 7 preferably is adjusted by varying the spacing between the geophones to equal $1.75\pi$ times said wave length. All horizontally traveling waves, having a frequency $f$ within said frequency band and generated by the detonation of an explosive charge at a point outside of the circular arrays, will be substantially cancelled or eliminated from the output of the group, thus providing a single record trace predominated by the reflected waves.

Figure 8:
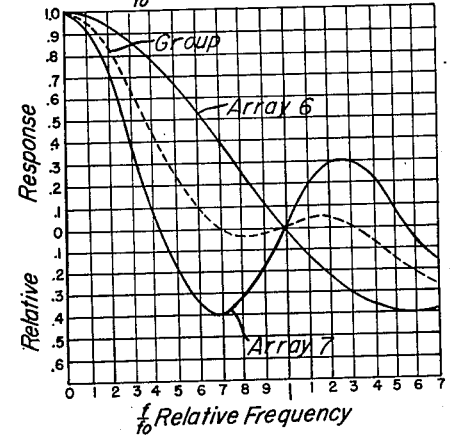
Figure 8 is a series of curves showing the relationship of the relative response of each of the arrays of a group of geophones arranged as shown in Figure 3, and also of the entire group, to the relative frequency of horizontally traveling waves.

Figure 8 is a series of curves showing the relationship of the relative response to the relative frequency for each of the arrays 6 and 7, and also for the geophone group, shown in Figure 3. It will be noted that the response of the group to horizontally traveling waves is less than 5 per cent of the maximum possible response within the frequency band, 0.65 $f_0$ to 1.38 $f_0$. It is readily seen that by making the cancellation frequency band of the geophone group correspond to the pass band of the seismic amplifiers through proper adjustment of the lengths of arrays 6 and 7 there may be obtained a record trace from which horizontally traveling waves have been substantially completely eliminated.

The geophone groups provided in accordance with this invention, and above described, are adapted to be connected to a recorder circuit to form a single record trace. A complete record resulting from a single detonation comprises a plurality of traces each produced in the manner above described. To this end there are utilized several such geophone groups forming a spread, with each group connected to a recorder circuit of a seismograph, not shown.

In Figure 4, there is shown a spread consisting of three geophone groups 8, 9, and 10, such as is illustrated in Figure 1. By means of the spread a multitrace record may be obtained, which is substantially free of horizontally traveling waves moving longitudinally along the spread and within a predetermined frequency band.

In Figure 5 there is shown a similar spread for providing multitrace records and consisting of three geophone groups 11, 12, and 13 similar to that illustrated in Figure 3, the spread being adapted for use in areas where the undesirable waves are traveling in many directions relative to the spread.

It is to be understood that the number of geophone groups in a spread, such as shown in Figures 4 and 5, may be varied depending upon the number of traces desired on the record. Each group, however, is connected to a recorder circuit to provide a single record trace.

The distance between two parallel, straight line arrays of a group is not critical and may be varied from a few inches up to 30 feet or more, as desired. It is preferable, however, to space the arrays a distance of the order of ten feet.

While in the foregoing there has been shown and described the preferred embodiment of this invention, it is to be understood that minor changes in the details of construction, combination, and arrangement of parts may be resorted to without departing from the spirit and scope of the invention as claimed.

I claim:

1. In a system for seismic prospecting, an arrangement of seismic wave detectors in a group comprising detector arrays disposed in parallel relationship and each including a plurality of detectors equally spaced one from another, the arrays being of unequal lengths but of lengths such that response of each of the arrays to horizontally traveling waves of a predetermined frequency is zero, and a recorder circuit connected to the arrays in a manner so as to record the combined energy received by the group, thereby to produce a single record trace of reflected seismic waves substantially free of horizontally traveling waves within a predetermined frequency band, the mid-frequency of which corresponds approximately to said predetermined frequency.

2. In a system for seismic prospecting, an arrangement of seismic wave detectors in a group comprising two detector arrays disposed in parallel relationship and each including a plurality of detectors equally spaced one from another, the arrays being of unequal lengths but of lengths such that response of each of the arrays to horizontally traveling waves of a predetermined frequency is zero, and a recorder circuit connected to the arrays in a manner so as to record the combined energy received by the group, thereby to produce a single record trace of reflected seismic waves substantially free of horizontally traveling waves within a predetermined frequency band, the mid-frequency of which corresponds approximately to said predetermined frequency.

3. In a system for seismic prospecting, an arrangement of seismic wave detectors in a group comprising two circular detector arrays disposed in concentric relationship and each including a plurality of detectors equally spaced one from another, the arrays being of unequal lengths but of lengths such that response of each of the arrays to horizontally traveling waves of a predetermined frequency is zero, and a recorder circuit connected to the arrays in a manner so as to record the combined energy received by the group, thereby to produce a single record trace of reflected seismic waves substantially free of horizontally traveling waves within a predetermined frequency band, the mid-frequency of which corresponds approximately to said predetermined frequency.

4. In a system for seismic prospecting, an arrangement of seismic wave detectors in a group comprising two circular detector arrays disposed in concentric relationship and each including at least eight detectors equally spaced one from another, the arrays being of unequal lengths but of lengths such that response of each of the arrays to horizontally traveling waves of a predetermined frequency is zero, and a recorder circuit connected to the arrays in a manner so as to record the combined energy received by the group, thereby to produce a single record trace of reflected seismic waves substantially free of horizontally traveling waves within a predetermined frequency band, the mid-frequency of which corresponds approximately to said predetermined frequency.

5. In a system for seismic prospecting, an arrangement of seismic wave detectors in a group comprising two circular detector arrays disposed in concentric relationship and each including at least eight detectors equally spaced one from another, the arrays being of unequal lengths but of lengths such that response of each of the arrays to horizontally traveling waves of a predetermined frequency is zero, and a recorder circuit connected to the arrays in a manner so as to record the combined energy received by the group, thereby to produce a single record trace of reflected seismic waves substantially free of horizontally traveling waves within a predetermined frequency band, the mid-frequency of which corresponds approximately to said predetermined frequency, the shorter array being of a length equal to $0.76\pi$ times the wave length of the horizontally traveling waves of the predetermined frequency.

6. In a system for seismic prospecting, an arrangement of seismic wave detectors in a group comprising two circular detector arrays disposed in concentric relationship and each including at least eight detectors equally spaced one from another, the arrays being of unequal lengths but of lengths such that response of each of the arrays to horizontally traveling waves of a predetermined frequency is zero, and a recorder circuit connected to the arrays in a manner so as to record the combined energy received by the group, thereby to produce a single record trace of reflected seismic waves substantially free of horizontally traveling waves within a predetermined frequency band, the mid-frequency of which corresponds approximately to said predetermined frequency, the shorter array being of a length equal to $0.76\pi$ times the wave length of the horizontally traveling waves of the predetermined frequency, and the other array being of a length equal to $1.75\pi$ times said wave length.

7. In a system for seismic prospecting, an arrangement of seismic wave detectors in a group comprising two straight line arrays disposed in parallel relationship and each including a plurality of detectors equally spaced one from another, the arrays being of unequal lengths but of lengths such that response of each of the arrays to horizontally traveling waves of a predetermined frequency is zero, and a recorder circuit connected to the arrays in a manner so as to record the combined energy received by the group, thereby to produce a single record trace of reflected seismic waves substantially free of horizontally traveling waves within a predetermined frequency band, the mid-frequency of which corresponds approximately to said predetermined frequency.

8. In a system for seismic prospecting, groups of detectors, each group comprising detector arrays disposed in parallel relationship and each including a plurality of detectors equally spaced one from another, the arrays being of unequal lengths but of lengths such that response of each of the arrays to horizontally traveling waves of a predetermined frequency is zero, and a separate recording circuit for each of said groups, each recording circuit being connected so as to record the combined energy received by all detectors in the group with which it is associated, thereby to produce record traces of reflected seismic waves substantially free of horizontally traveling waves within a predetermined frequency band, the mid-frequency of which corresponds appriximately to said predetermined frequency.

9. In a system for seismic prospecting, a plurality of detector groups, each group comprising two detector arrays disposed in parallel relationship and each including a plurality of detectors equally spaced one from another, the arrays being of unequal lengths but of lengths such that response of each of the arrays to horizontally traveling waves of a predetermined frequency is zero, and a separate recording circuit for each of said groups, each recording circuit being connected so as to record the combined energy received by all detectors in the group with which it is associated, thereby to produce record traces of reflected seismic waves substantially free of horizontally traveling waves within a predetermined frequency band, the mid-frequency of which corresponds approximately to said predetermined frequency.

10. In a system for seismic prospecting, a plurality of detector groups, each group comprising two circular detector arrays disposed in concentric relationship and each including a plurality of detectors equally spaced one from another, the arrays being of unequal lengths but of lengths such that response of each of the arrays to horizontally traveling waves of a predetermined frequency is zero, and a separate recording circuit for each of said groups, each recording circuit being connected so as to record the combined energy received by all detectors in the group with which it is associated, thereby to produce record traces of reflected seismic waves substantially free of horizontally traveling waves within a predetermined frequency band, the mid-frequency of which corresponds approximately to said predetermined frequency.

11. In a system for seismic prospecting, a plurality of detector groups, each group comprising two circular detector arrays disposed in concentric relationship and each including at least eight detectors equally spaced one from another, the arrays being of unequal lengths but of lengths such that response of each of the arrays to horizontally traveling waves of a predetermined frequency is zero, and a separate recording circuit for each of said groups, each recording circuit being connected so as to record the combined energy received by all detectors in the group with which it is associated, thereby to produce record traces of reflected seismic waves substantially free of horizontally traveling waves within a predetermined frequency band, the mid-frequency of which corresponds approximately to said predetermined frequency.

12. In a system for seismic prospecting, a plurality of detector groups, each group comprising two circular detector arrays disposed in concentric relationship and each including at least eight detectors equally spaced one from another, the arrays being of unequal lengths but of lengths such that response of each of the arrays to horizontally traveling waves of a predetermined frequency is zero, and a separate recording circuit for each of said groups, each recording circuit being connected so as to record the combined energy received by all detectors in the group with which it is associated, thereby to produce record traces of reflected seismic waves substantially free of horizontally traveling waves within a predetermined frequency band, the mid-frequency of which corresponds approximately to said predetermined frequency, the shorter array being of a length equal to $0.76\pi$ times the wave length of the horizontally traveling waves of said predetermined frequency.

13. In a system for seismic prospecting, a plurality of detector groups, each group comprising two circular detector arrays disposed in concentric relationship and each including at least eight detectors equally spaced one from another, the arrays being of unequal lengths but of lengths such that response of each of the arrays to horizontally traveling waves of a predetermined frequency is zero, and a separate recording circuit for each of said groups, each recording circuit being connected so as to record the combined energy received by all detectors in the group with which it is associated, thereby to produce record traces of reflected seismic waves substantially free of horizontally traveling waves within a predetermined frequency band, the mid-frequency of which corresponds approximately to said predetermined frequency, the shorter array being of a length equal to $0.76\pi$ times the wave length of the horizontally traveling waves of said predetermined frequency, and the other array being of a length equal to $1.75\pi$ times said wave length.

14. In a system for seismic prospecting, a plurality of detector groups, each group comprising two straight line arrays disposed in parallel relationship and each including a plurality of detectors equally spaced one from another, the arrays being of unequal lengths but of lengths such that response of each of the arrays to horizontally traveling waves of a predetermined frequency is zero, and a separate recording circuit for each of said groups, each recording circuit being connected so as to record the combined energy received by all detectors in the group with which it is associated, thereby to produce record traces of reflected seismic waves substantially free of horizontally traveling waves within a predetermined frequency band, the mid-frequency of which corresponds approximately to said predetermined frequency.

References Cited in the file of this patent

UNITED STATES PATENTS

| Number | Name | Date |
|---|---|---|
| 2,203,140 | Green | June 4, 1940 |
| 2,232,612 | Klipsch | Feb. 18, 1941 |
| 2,232,613 | Klipsch | Feb. 18, 1941 |
| 2,305,383 | Hoover | Dec. 15, 1942 |
| 2,329,721 | Hoover, Jr., et al. | Sept. 21, 1943 |
| 2,331,080 | Petty | Oct. 5, 1943 |
| 2,473,469 | Dahm | June 14, 1949 |
| 2,555,806 | Mitchell, Jr. | June 5, 1951 |

FOREIGN PATENTS

| Number | Country | Date |
|---|---|---|
| 701,747 | France | Jan. 13, 1931 |